Oct. 1, 1963

D. L. ANDERSON ETAL 3,105,344

NUT HARVESTING MACHINE

Filed June 21, 1961

INVENTORS
Dewey L. Anderson
Wayne H. Woods

BY

ATTORNEY

Oct. 1, 1963   D. L. ANDERSON ETAL   3,105,344
NUT HARVESTING MACHINE
Filed June 21, 1961   5 Sheets-Sheet 2

INVENTORS
Dewey L. Anderson
Wayne H. Woods
BY
ATTORNEY

Oct. 1, 1963
D. L. ANDERSON ETAL
3,105,344
NUT HARVESTING MACHINE
Filed June 21, 1961
5 Sheets-Sheet 3
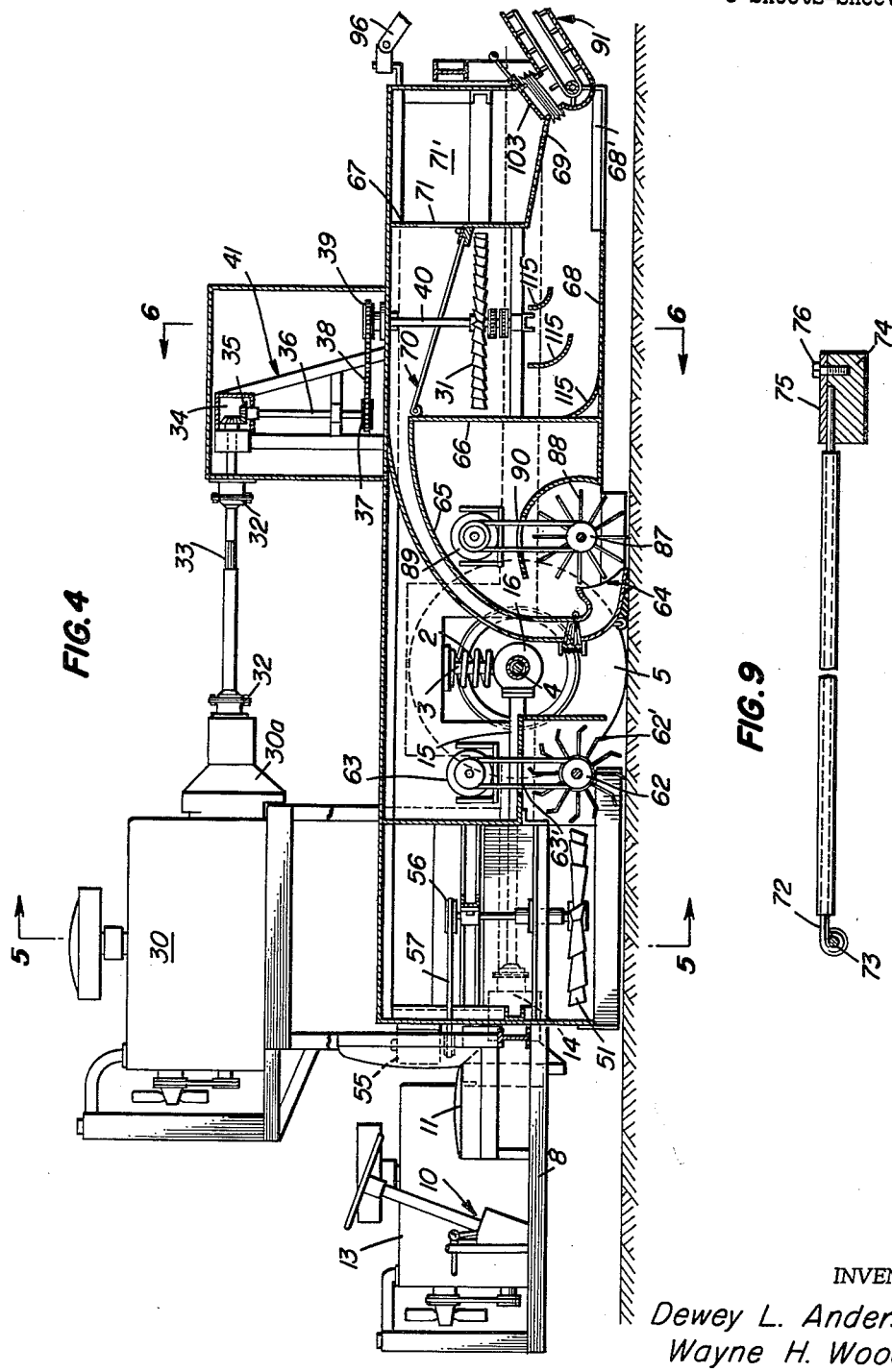
INVENTORS
Dewey L. Anderson
Wayne H. Woods
BY
ATTORNEY

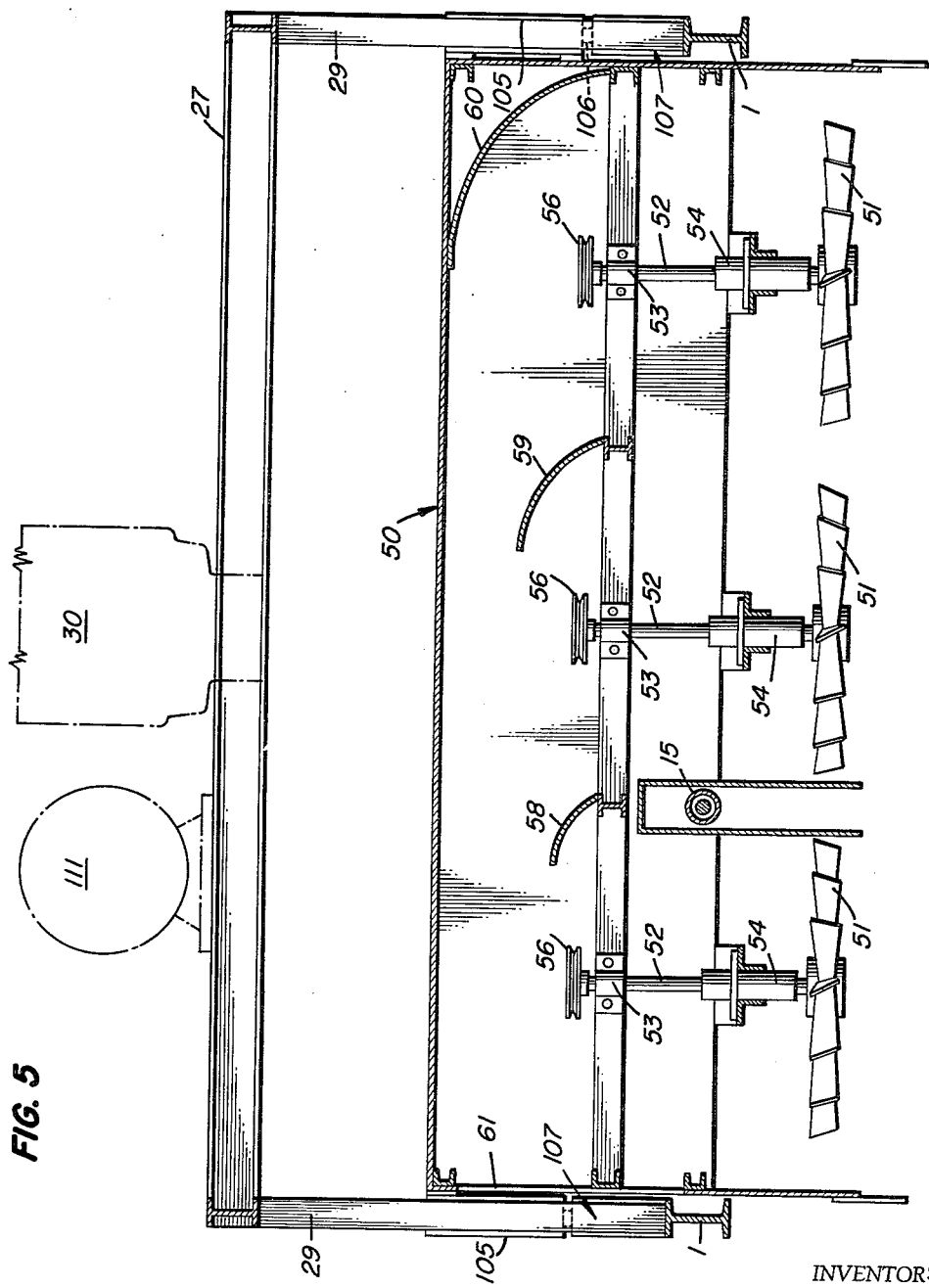

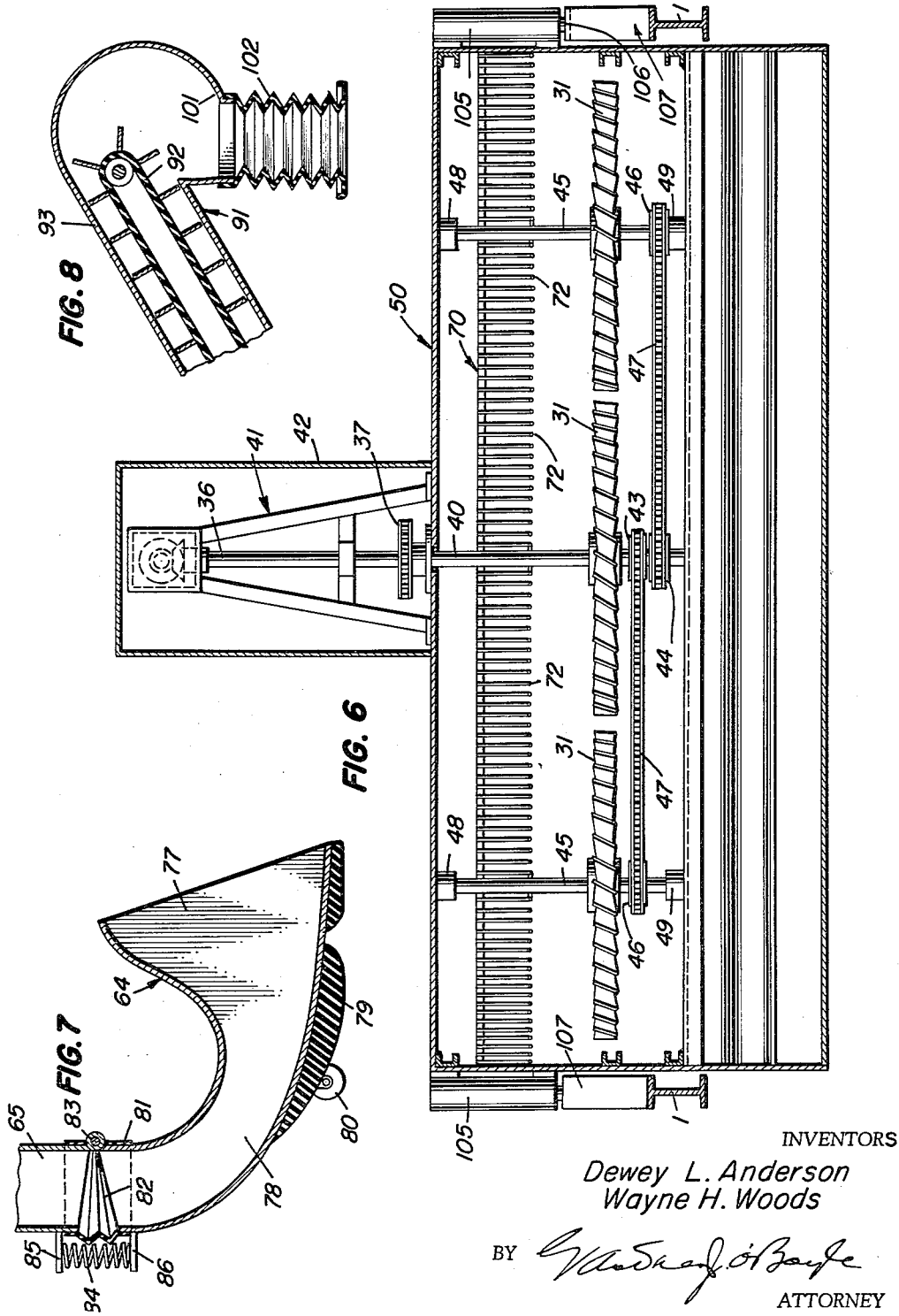

United States Patent Office 3,105,344
Patented Oct. 1, 1963

3,105,344
NUT HARVESTING MACHINE
Dewey L. Anderson, 1503 Forsyth Ave., and Wayne H.
Woods, 1004 Speed St., both of Monroe, La.
Filed June 21, 1961, Ser. No. 118,674
5 Claims. (Cl. 56—328)

The present invention relates to a machine for harvesting nuts, and more particularly to an improved machine for gathering pecan nuts from the ground and separating them from twigs, leaves and other foreign materials picked up therewith.

Heretofore pecan nuts have been harvested by hand, and also by means of mechanical harvesters. The high cost of labor has been made hand harvesting prohibitive in large scale pecan harvesting operations, and the mechanical harvesters employing rotary pickup devices, suctions means, and endless conveyors, as heretofore suggested, are open to objection as being cumbersome and difficult to maneuver, inefficient in removing the nuts from the ground, and in separating leaves, twigs, and other foreign materials therefrom, prior to delivery of the nuts to a storage bin or other collecting unit.

An object of our invention is to provide an improved, self-propelled, machine for harvesting pecan nuts.

Another object of our invention is to provide an improved machine for harvesting nuts, wherein means are provided for moving relatively large, heavy debris to one side of the machine, as the machine moves over the ground, and for pneumatically removing relatively small debris from the ground and discharging it to atmosphere through a discharge port at one side of the machine.

Yet another object of our invention is to provide an improved, self-propelled, nut harvesting machine having suction means for removing relatively small debris and discharging the same to atmosphere and separate suction means for removing nuts from the ground and discharging them into a storage bin or other collecting unit.

Still another object of our invention is to provide an improved nut harvesting machine wherein mechanical means are provided for lifting relatively small debris and nuts from the ground, and propelling the same into the inlet nozzles of the suction means.

A further object of our invention is to provide an improved, self-propelled, nut harvesting machine, including a frame wherein the mechanical and suction means for lifting the relatively small debris and the nuts from the ground, are mounted within and secured to a housing supported on the vehicle frame, said housing being adapted for vertical movement relative to the frame.

A still further object of our invention is to provide an improved, self-propelled, nut harvesting vehicle having deflecting means associated with each of the wheels of the vehicle.

With these and other objects in view, which may be incident to our improvements, the invention consists in the parts and combinations to be hereinafter set forth and claimed, with the understanding that the several necessary elements comprising our invention, may be varied in construction, proportions and arrangements, without departing from the spirit and scope of the appended claims.

In order to make our invention more clearly understood, we have shown in the accompanying drawings means for carrying the same into practical effect, without limiting the improvements in their useful application to the particular constructions which, for the purpose of explanation, have been made the subject of illustration.

In the drawings:

FIG. 4 is a view similar to FIG. 2, partly in section, showing the harvesting mechanism and drive means therefor;

FIG. 5 is a sectional view taken along line 5—5 of FIG. 4;

FIG. 6 is a sectional view taken along line 6—6 of FIG. 4;

FIG. 7 is an enlarged sectional view of a suction inlet;

FIG. 8 is a sectional view of the discharge end of the conveyor housing; and

FIG. 9 is a detail view of one of the grate elements, and the mounting means therefor.

Figure 1:
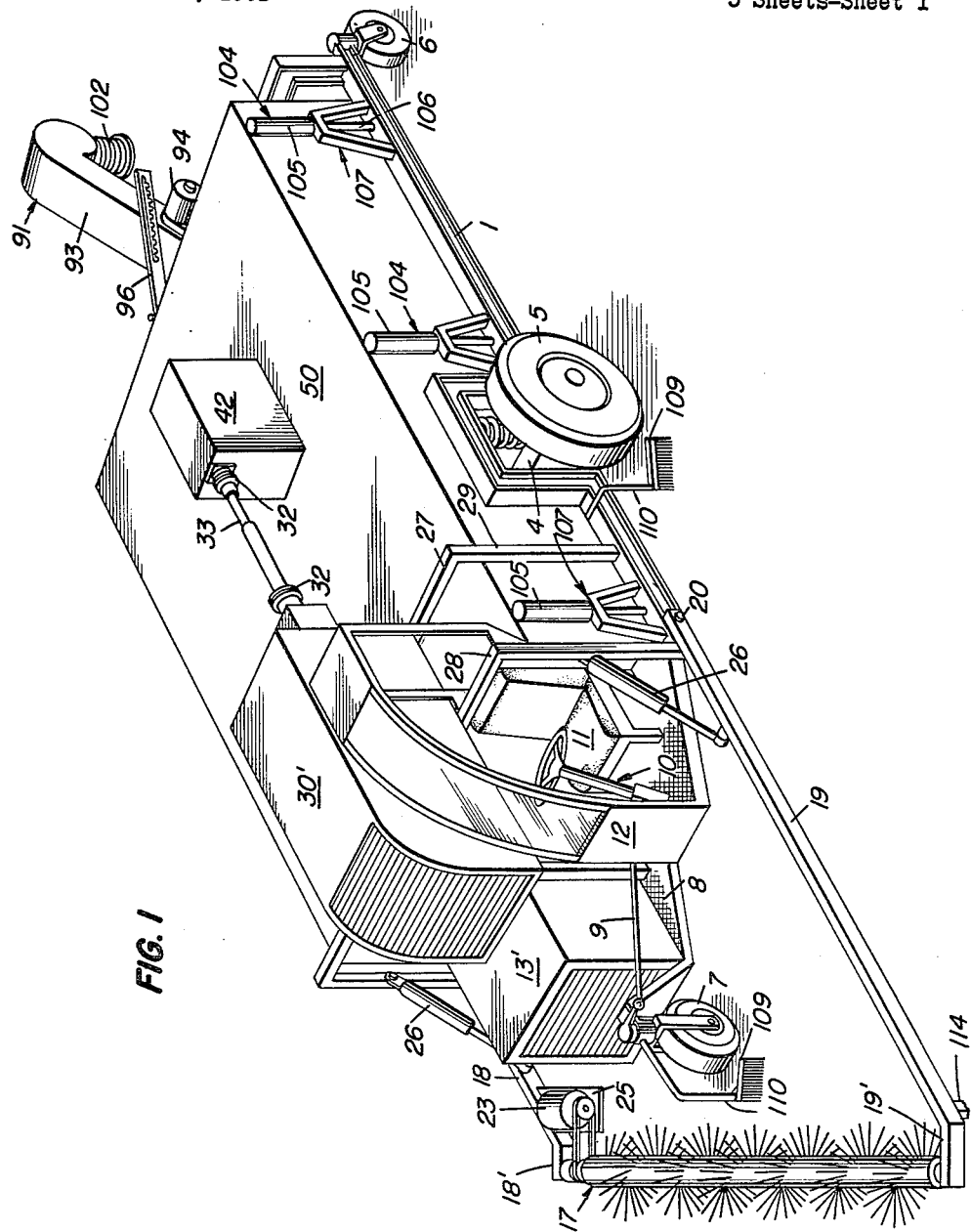
FIGURE 1 is a perspective view of our improved pecan harvester.

Referring to the drawings, and more particularly to FIGS. 1–4 thereof, our improved harvester comprises a main frame 1 supported by means of a pair of suspension units, each of said units comprising a coil spring 2 and a shock absorber 3 concentric therewith, mounted between the main frame and the axle 4, having driving wheels 5 mounted thereon. Suitable caster wheels 6 are mounted at the rear of the main frame, and a guide wheel 7 is pivotally mounted on a floor 8 rigidly secured to the main frame and extending forwardly thereof, said floor being adapted to support the harvester main propulsion engine, the drive means for the main suction fans, and the driver's cab, as will be explained more fully hereinafter.

Figures 2, 3:
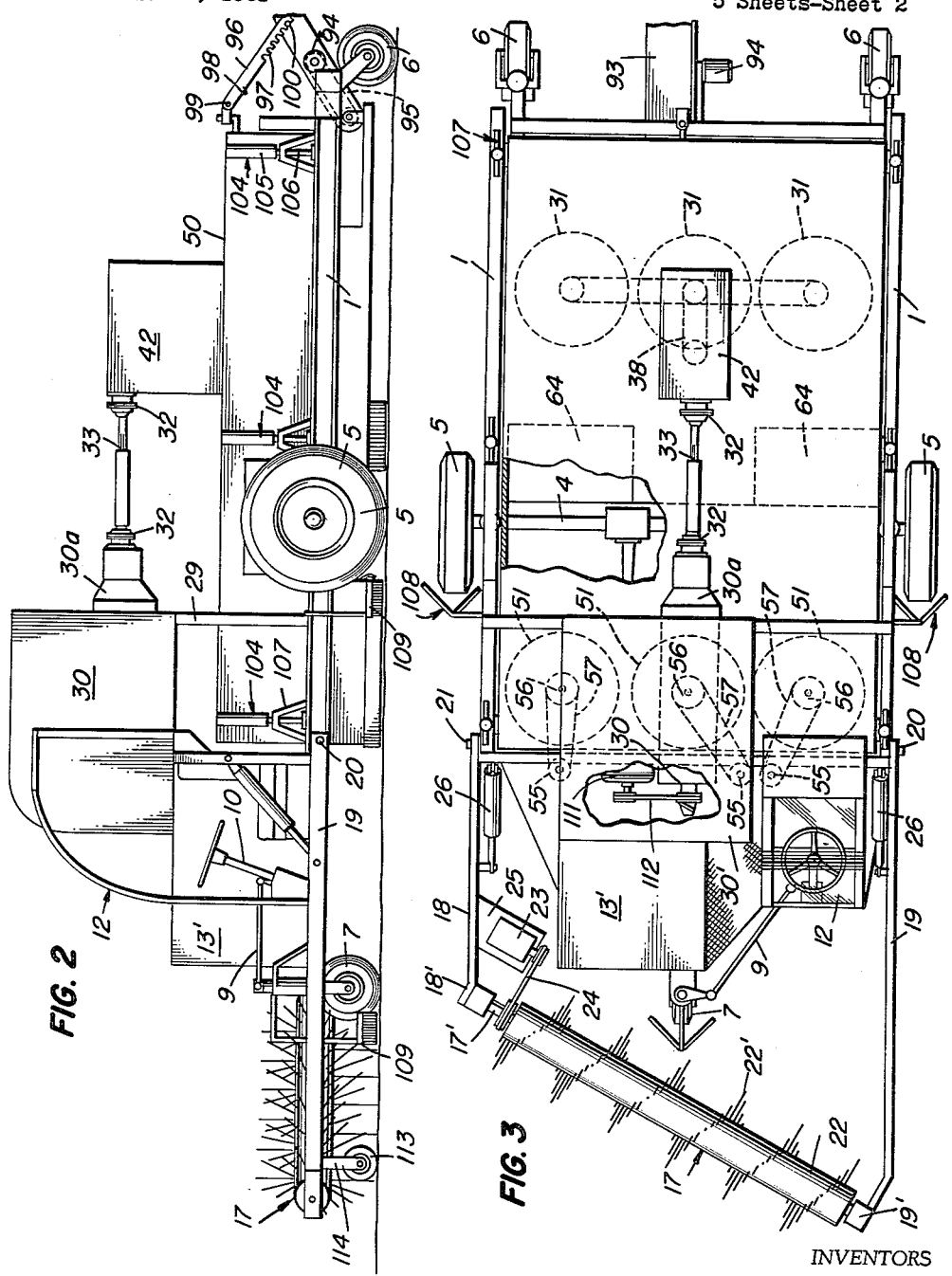
FIG. 2 is a side elevational view of the pecan harvester shown in FIG. 1.
FIG. 3 is a top plan view of the harvester shown in FIG. 2, with portions of the housing cut away, showing the drive arrangement for the harvester and elements thereof.

Suitable linkage 9 is provided between the guide wheel 7 and the steering mechanism, designated generally by numeral 10, for turning the guide wheel. A seat 11 is provided for the operator, which seat, together with the steering mechanism 10, and main propulsion system controls, not shown, are enclosed within a cab 12. The main propulsion system for the harvester comprises an internal combustion engine 13 (FIG. 4) having the usual transmission 14, drive shaft 15, and differential 16 for driving the wheels 5, the engine 13 being enclosed by means of a suitable housing 13', as shown in FIGS. 1–3.

A brush assembly, designated generally by numeral 17, is rotatably mounted on arms 18 and 19, which arms are pivotally secured to the main frame 1 of the machine, as at 20 and 21, respectively. In connection with the mounting arrangement of the brush, it will be noted that the end portions of the brush shaft 17' are rotatably supported in the terminal sections 18' and 19' of the arms 18 and 19, respectively, and that by reason of the difference in length of these arms, the brush is diagonally positioned at the front of the machine, whereby one end of the brush leads the other end thereof. The purpose of this arrangement, that is to say, the angular disposition of the brush at the front end of the machine, is to clear away relatively large debris lying in the path of the harvester.

The brush assembly comprises a cylinder 22 having a plurality of spirally arranged, spring steel fingers 22' mounted thereon, the ends of the fingers are spaced a predetermined distance from the ground in order that heavy debris may be pushed to one side of the machine as it advances during the harvesting operation while at the same time leaving the nuts to be harvested on the ground. Rotation of the cylinder is accomplished by means of an electric motor 23 and its associated drive belt 24. The motor may be conveniently supported on a platform 25, secured to the arm 18, and the arms 18 and 19, together, with the brush assembly, may be raised and lowered, as desired, by means of fluid motors 26 operatively connected between the frame of the cab 12 and the arms, as shown.

Suitable support members 27, 28 and 29, for supporting an internal combustion engine 30 (FIGS. 3 and 4) used to drive a first set of suction fans 31, are secured to the floor 8 of the harvester. The motor 30 is enclosed within a housing 30' and is provided with a conventional transmission 30a, universal joints 32, and a splined drive shaft 33. Connected to the drive shaft is a bevel gear 34 which meshes with a bevel gear 35 secured to the upper end of a vertical shaft 36, the lower end of this shaft being provided with a pulley 37 (FIG. 4) connected through belt means 38, in driving relationship with a pulley 39, fixedly secured to a shaft 40. A suitable framework, designated generally by numeral 41, is provided to maintain the shafts and their associated bevel gears 34 and 35 in alignment. The framework and drive mechanisms are enclosed by a housing 42, in order to protect them from adverse weather.

The suction fans 31 are driven by means of the shaft 40 to which the intermediate fan is fixedly secured. The lower end of the shaft 40 is provided with pulleys 43 and 44 adapted to drive the outboard shafts 45 through the medium of pulleys 46, and belts 47. The outboard shafts 45 (FIG. 6) are provided with suitable bearings 48 and 49 for rotatably supporting the shafts within a housing 50, as will be described more fully hereinafter. It will thus be seen from the foregoing description, that the suction fans 31 are driven by means of the engine 30, through the drive shafts 33 and 36, belt 38, drive shafts 40, and the belts 47.

The machine is further provided with a second set of suction fans 51 (FIG. 5) rotatably mounted in spaced relation in the housing 50, forwardly of the suction fans 31, as will be seen in FIG. 3. Each of the three fans of said second set is secured to a shaft 52 adapted to be rotatably supported on bearings 53 and 54, actuation for the shaft being effected by means of an electric motor 55, through the medium of a pulley 56 and a belt 57, FIGS. 3 and 4.

Reference being had to FIG. 5, it will be noted that the portion of the housing 50, within which the suction fans 51 are mounted, is provided with curved baffles or deflector members 58, 59 and 60, and with an opening 61 in one side thereof. Accordingly, when the motors 55 are actuated to drive the fans 51, small debris, such as leaves, twigs, pieces of grass, and the like, will be drawn into the housing and with the aid of the baffles, the debris will be deflected in the direction of the opening 61, and discharged therethrough with the air stream in which it is carried.

With reference to function of each set of suction fans 31 and 51, the first set described hereinabove, comprised of the fans 31, is designed for picking up or removing pecans and comparatively lightweight foreign material from the ground, and the second set comprising fans 51, is of such capacity that only debris of relatively light weight, for example, small twigs, leaves, pieces of grass and other materials, not cleared from the path of the machine by the brush 17 mounted on the forward portion of the harvester.

A drum 62 (FIG. 4), having a plurality of flexible fingers 62' secured thereto, is rotatably mounted in the housing 50 transversely thereof and rearwardly of the auxiliary fans 51. The drum 62 is adapted to be rotated in a clockwise direction by means of an electric motor 63, through a suitable belt 63' and, accordingly, by reason of the design and arrangement of the blades, any debris not picked up by the fans 51 will be kicked into the suction sides of the fans by the fingers 62'.

The suction intake for the pecans, or other nuts, to be harvested is comprised of three inlet nozzles 64, to be described more fully hereinafter, hingedly secured to a conduit or duct 65, extending transversely of the housing 50 and connecting the nozzles with the suction sides of the fans 31. These fans, which are used for removing pecans and comparatively small debris from the ground, are enclosed by means of vertical, transversely extending, partitions 66 and 67, a horizontal transversely extending partition 68 and a downwardly inclined partition 69. A grate 70, to be described more fully hereinafter, is secured between the vertical partitions 66 and 67, the latter partition being provided with an opening 71, whereby the harvested pecans, which slide downwardly on the grate, may be collected in a bin 71', defined by the top, side and end walls of the housing 50, and the partitions 67 and 69.

The grate member 70 is comprised of a plurality of rubber-covered rods 72 (FIGS. 6 and 9), one end of each rod being pivotally secured to a bar 73, extending transversely of the housing 50 and rigidly secured to the side walls thereof, the opposite end of each rod 72 being secured to a metal bar 74 by means of a plate 75 adapted to clamp the end portion of the rod to the bar, said plate being retained in clamping position by bolts 76. The metal bar 74 is supported on the vertical partition 67, and the rubber-covered rods are spaced from each other a sufficient distance to permit debris to pass therethrough, but close enough to prevent pecans from falling into the exhaust passage below the fans 31, during movement along the grate.

Each of the suction nozzles 64 is formed with an enlarged inlet 77 (FIG. 7) which gradually converges into a reduced throat portion 78, and is provided with a rubber apron 79 secured to the bottom surface of the nozzle, and with a small wheel or caster 80 to facilitate movement of the nozzle over the ground during the harvesting operation. It will be appreciated that during the harvesting operation, when the harvester moves over terrain of irregular contour, that is, over terrain having a surface formed with undulations, or when the rubber apron 79 on the wheel 80 encounters an obstruction, the portion of a nozzle 64, in the vicinity of its entrant 77, is forced upwardly so as to clear the obstruction. In order to permit limited swinging movement of the nozzle with respect to the duct 65, it is attached to the duct by means of a flexible collar or sleeve 81 having a central bellows portion 82, pivoted as at 83, the end portions of the duct and the nozzle being insertable into the collar and retained therein by a tension spring 84 having one end secured to an arm or bracket 85 carried by the duct 65, the opposite end of the spring being secured to a similar arm 86 attached to nozzle, whereby the bottom portion of the nozzle is spring-biased into ground-contacting position.

By means of the above described nozzle mounting arrangement, as the rubber apron 79 moves over the pecan nuts on the ground, the nozzle is free to move upwardly about the pivot 83 so as not to damage or injure any of the nuts, and after the trailing edge of the nozzle clears the nuts or other obstructions, it is immediately brought back into ground-contacting position by the tension spring. It is to be particularly noted that the rubber apron 79, secured to the bottom portion of each nozzle, not only prevents injury to the pecan nuts which have fallen on the ground, but it also provides a seal between the nozzle and the ground, thereby enhancing the suction power of the fans 31, whose primary function is to remove the pecans from the ground and convey them to the grate member 70, as heretofore described.

A drum 87 (FIG. 4), having a plurality of flexible fingers 88, secured thereto, is rotatably mounted in the housing 50, transversely thereof and adjacent the inlets of the nozzles 64. The drum is adapted to be rotated in a clockwise direction by means of an electric motor 89 in conjunction with a suitable belt 90, and as the machine moves forwardly during the harvesting operation, the pecans are propelled into the nozzle inlets and conveyed through the duct 65 to the grate member 70, and thence into the storage bin 71', from which they may be removed by means of an endless conveyor, designated generally by numeral 91, and deposited in a transport vehicle, not shown.

The conveyor 91 comprises an endless belt 92 enclosed within a housing 93, pivotally secured to the rear of the harvester, said belt being adapted to be driven by an electric motor 94 and associated belt drive means 95. In order to support the conveyor at a desired angle of inclination, an arm 96, having a series of notches 97 formed in the lower edge 98 (FIG. 2) thereof, is pivotally attached as at 99 to the end of the machine, said notches being adapted for engagement with a pin 100 secured to the conveyor housing. By selectively engaging the pin 100 with any one of the notches, the inclination of the conveyor may be varied. As will be seen in FIGS. 1 and 8, the discharge end of the conveyor housing is in the form of a spherical shaped hood, the outlet 101 thereof being provided with a bellows type sleeve 102 through which the pecans are directed into a truck or other transport vehicle, not shown. A suitable closure member 103 is provided for the outlet opening of the storage bin 71', whereby the flow of pecans from the bin to the conveyor belt 92 may be controlled.

From the description of the machine hereinabove, it will be observed that several of the harvesting components, for example, the suction fans and their associated drive mechanism, the drums used for propelling debris and nuts into the suction inlets of the fans, and the suction nozzles for receiving the pecans picked up from the ground, are either mounted on or carried by the housing 50, supported on the vehicle frame 1. During transport of the vehicle to storage, or along a highway, or from one orchard to another, it is advisable that the components which are in ground-contacting position during the harvesting operation, be elevated, and maintained in raised position, while in transport.

In accordance with the present invention, means are provided for raising and lowering the housing 50 with respect to the vehicle frame 1, comprising a plurality of fluid motors, designated generally by numeral 104, each of said motors comprises a cylinder 105 secured to the side wall of the housing, and a piston rod 106 having its outboard end secured to the vehicle frame. A support member 107 (FIGS. 1 and 2) is interposed between the bottom of each cylinder 105 and the vehicle frame, whereby to stabilize the housing when it is in the lowered position. Suitable control means, not shown, preferably located in the vehicle cab, will enable the operator to activate the fluid motors for raising or lowering the housing with respect to the vehicle frame, as desired.

Referring to FIGS. 1–3, it will be noted that guard means 108 are provided, adapted to divert pecans from the paths of the drive wheels 5 and the path of guide wheel 7. Each of the guard members comprises a V-shaped brush 109 having a hanger 110 supported on the vehicle frame forwardly of the drive wheels, and on the swivel bracket of the guide wheel, forwardly thereof. In lieu of using brushes of the above described type, spherical wedge-shaped sectors formed from rubber or other suitable material may be supported forwardly of the wheels, the edge of the dihedral angle formed by the faces of the sector, facing in the direction of the forward movement of the harvester, so as to deflect the pecans from the paths of the wheels. It is further contemplated that the brush hangers may be supported in such fashion that they may be elevated with respect to their points of support during transport of the machine.

For the purpose of supplying current to the several electric motors used in connection with certain of the harvesting components, an electric generator 111 (FIG. 3) is provided, which generator is adapted to be driven by means of the internal combustion engine 30, through belt means 112. In order to provide additional support for the arms 18 and 19, which carry the brush 17 and its driving motor 23, small wheels or casters 113 are rotatably supported on brackets 114 attached to said arms in the vicinity of the outboard ends thereof.

In the operation of the nut harvesting machine, assuming that the brush 17 is in its lowered, operative position and that the housing 50 has been lowered with respect to the frame 1 of the machine, as the machine moves over the ground, the brush 17 pushes relatively large debris to one side of the machine, and the fans 51 withdraw small debris, such as leaves, twigs, and pieces of grass from the ground; the debris being discharged through the outlet opening 61 of the housing. Introduction of the debris into the suction sides of the fans 51 is augmented by means of the drum 62 having fingers 62' adapted to kick or otherwise propel the small pieces of debris into the suction inlets of the fans. At this stage of the harvesting operation, substantially all of the debris has been cleared from the path of the machine, and the pecan nuts are then picked up by the suction fans 31, in cooperation with the drum 87 and conveyed through the conduit or duct 65 to the grate member 70, the nuts rolling or sliding down the grate, and through the opening 71 into the storage bin 71', from whence they are removed by the endless conveyor 91, to a suitable truck or other transport vehicle, not shown. During passage of the nuts over the grate member 70, any particles of foreign material adhering to the pecans, and any small debris which may have been picked up by the fans 31 will be drawn down through the grate and deflected by baffles 115, and discharged through the opening 68' in the bottom 68 of the housing.

With reference to the construction and arrangement of the vehicle housing, and the mounting of the nut harvesting components therein, it will be appreciated that suitable access openings will be provided in the housing for purposes of inspection, servicing, and making any necessary repairs to the various components mounted within the housing.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

We claim:

1. A self-propelled nut harvesting machine comprising a frame resiliently supported on the unsprung portion of the vehicle and a housing supported on said frame, means rotatably supported on the frame forwardly thereof for removing relatively large debris from the path of the machine, a first suction means supported on the housing for removing relatively small debris from the ground and discharging it to one side of the machine, pick-up means rotatably mounted on the housing adjacent the first suction means adapted to propel debris into the suction means, a second suction means supported on the housing adapted to remove nuts from the ground, pick-up means rotatably mounted on the housing adjacent said second suction means adapted to propel nuts into the suction means, a storage receptacle carried by the vehicle housing, means for conveying the harvested nuts to said storage receptacle, and means operatively connected between the vehicle frame and the housing for raising and lowering the housing relative to the frame, whereby the first and second suction means, the debris pick-up means and the nut pick-up means may be elevated and maintained in raised position while the harvesting machine is in transport.

2. A self-propelled nut harvesting machine comprising a frame resiliently supported on the unsprung portion of the vehicle and a housing supported on said frame, means rotatably supported on the frame forwardly thereof for removing relatively large debris from the path of the machine, a first suction means supported on the housing for removing relatively small debris from the ground and discharging it to one side of the machine, pick-up means rotatably mounted on the housing adjacent the first suction means adapted to propel debris into the suction means, a second suction means supported on the housing adapted to remove nuts from the ground, pick-up means rotatably mounted on the housing adjacent said second suction means adapted to propel nuts into the suction means, a storage receptacle carried by the vehicle housing, and means for conveying the harvested nuts to said storage receptacle, said second suction means comprising three fans rotatably mounted in spaced relation, transversely of the housing, duct means mounted in the housing, one end of said duct means being connected to the suction sides of said fans, at least one inlet nozzle pivotally supported on the duct, said inlet nozzle being connected to the opposite end of said duct, at least one inlet nozzle pivotally supported on the duct, a downwardly inclined grate mounted in the housing on the suction sides of the fans and adjacent the outlet end of the duct, a curved baffle mounted in the housing adjacent the discharge side of each of the fans, the housing having an opening formed in the bottom thereof, whereby debris removed from the nuts drawn into the inlet nozzle flows downwardly through the grate and is deflected by the curved baffles and discharged through the bottom opening of the housing, the cleaned, harvested nuts passing over the grate and discharging into the storage receptacle.

3. A self-propelled nut harvesting machine in accordance with claim 2, wherein the storage receptacle for the harvested nuts comprises portions of the top, side and end walls of the housing, a vertical partition spaced from and parallel to the end wall of the housing, one end of said vertical partition being secured to the top wall of the housing and the other end thereof being secured to a downwardly inclined panel comprising the bottom of the storage receptacle, the vertical partition having an opening formed therein adjacent the lower end of the grate, whereby nuts removed from the ground by the second suction means slide downwardly on the inclined grate through the opening in the vertical partition into the storage receptacle.

4. A self-propelled nut harvesting machine in accordance with claim 2, wherein the inlet of the second suction means comprises a plurality of nozzles, each of the nozzles having an enlarged inlet converging into a reduced throat portion, a rubber apron secured to the bottom surface of each nozzle in the vicinity of its inlet portion, said inlet portion of the nozzle being spring-biased into ground-engaging position when the vehicle housing is in its lowered position on the frame, during the harvesting operation.

5. A self-propelled nut harvesting machine in accordance with claim 3, wherein the grate comprises a plurality of spaced, parallel, downwardly inclined rubber-covered rods, a transversely extending bar secured to the side walls of the vehicle housing, one end of each rod being pivotally secured to said bar, the opposite end of each rod being rigidly secured to the vertical partition of the storage bin adjacent the inlet opening thereof.

References Cited in the file of this patent
UNITED STATES PATENTS

| | | |
|---|---|---|
| 1,565,162 | King | Dec. 8, 1925 |
| 2,789,408 | Bloxham | Apr. 23, 1957 |
| 2,901,879 | Jones | Sept. 1, 1959 |